Figure 1:
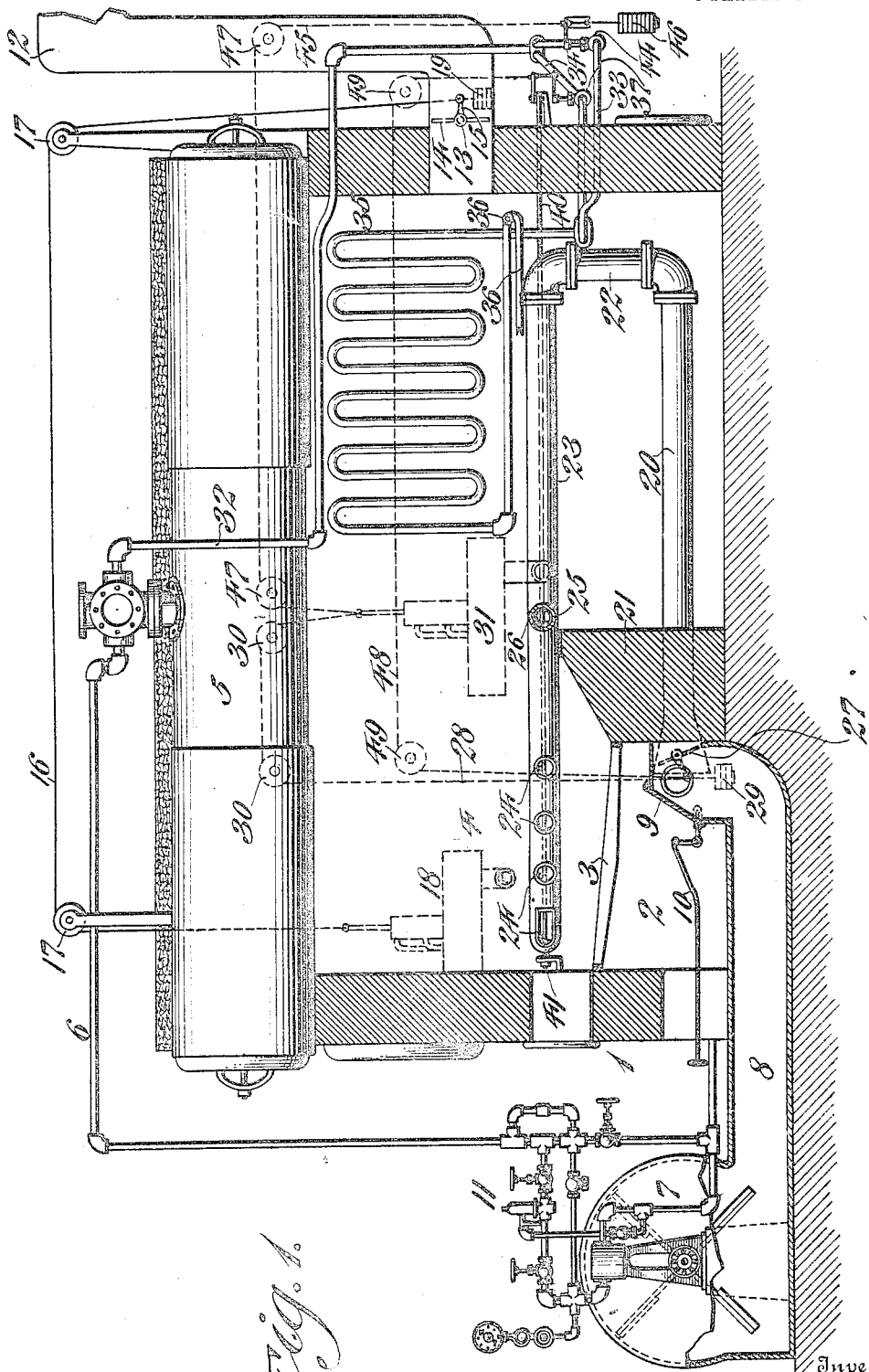

F. H. BROWN.
METHOD OF PRODUCING A SUBSTANTIALLY COMPLETE COMBUSTION OF FUEL.
APPLICATION FILED DEC. 8, 1908. RENEWED DEC. 30, 1912.

1,052,796.

Patented Feb. 11, 1913.

3 SHEETS—SHEET 1.

F. H. BROWN.
METHOD OF PRODUCING A SUBSTANTIALLY COMPLETE COMBUSTION OF FUEL.
APPLICATION FILED DEC. 8, 1908. RENEWED DEC. 30, 1912.

1,052,796.

Patented Feb. 11, 1913.
3 SHEETS—SHEET 2.

Witnesses
L. Douville,
O. F. Nagle,

Inventor
Francis H. Brown.
By Wiedersheim & Fairbanks
Attorneys

F. H. BROWN.
METHOD OF PRODUCING A SUBSTANTIALLY COMPLETE COMBUSTION OF FUEL.
APPLICATION FILED DEC. 8, 1908. RENEWED DEC. 30, 1912.
1,052,796.
Patented Feb. 11, 1913.
3 SHEETS—SHEET 3.
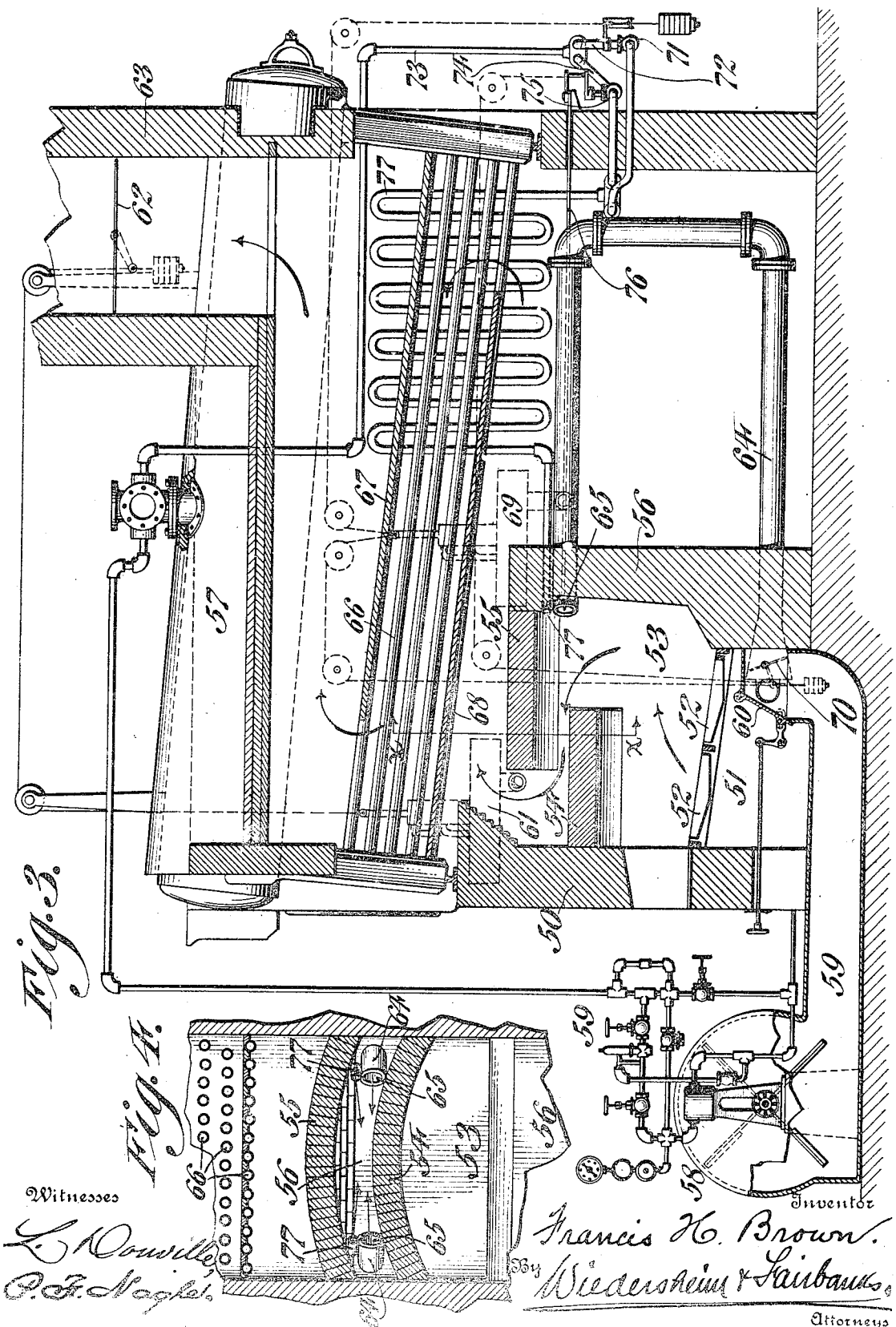

UNITED STATES PATENT OFFICE.

FRANCIS H. BROWN, OF PHILADELPHIA, PENNSYLVANIA, ASSIGNOR OF ONE-FOURTH TO JOHN S. LATTA, ONE-FOURTH TO THOMAS L. LATTA, AND ONE-FOURTH TO JAMES LATTA, ALL OF PHILADELPHIA, PENNSYLVANIA.

METHOD OF PRODUCING A SUBSTANTIALLY COMPLETE COMBUSTION OF FUEL.

1,052,796.      Specification of Letters Patent.      Patented Feb. 11, 1913.

Application filed December 8, 1908, Serial No. 466,530. Renewed December 30, 1912. Serial No. 739,375.

*To all whom it may concern:*

Be it known that I, FRANCIS H. BROWN, a citizen of the United States, residing at Philadelphia, in the county of Philadelphia, State of Pennsylvania, have invented a new and useful Method of Producing a Substantially Complete Combustion of Fuel, of which the following is a specification.

The object of my present invention is to devise a method of producing complete combustion of fuel under ordinary operating conditions. To accomplish this in practice the draft for primary combustion is controllable, and the draft for secondary combustion is controllable, the air for secondary combustion being heated to a desired temperature before it is introduced into the furnace above the bed of fuel, and also automatically regulating the injection of steam superheated to a desired temperature into such heated air or preferably directly into the furnace above the bed of fuel, in proximity to the discharge of the heated air into the furnace, whereby a new chemical reaction takes place within the furnace since the steam introduced is heated to such a degree that it becomes separated into its component elements so that such elements are free to recombine in a new manner with the oxygen of the heated air and the combustible elements in the products of combustion which are a result of the primary combustion of the fuel, it thus being seen that by my novel method that the gases and elements unconsumed by the primary combustion are caused to recombine with other elements in such a manner that a new supply of combustible matter is produced in the furnace and ignited, burning at a very high temperature, and as is evident, causing complete and smokeless combustion and the consequent development of a very high heat efficiency with the use of all kinds of fuel.

Another object of my present invention is to devise a novel method of regulating combustion whereby a substantially perfect combustion of fuel is secured in which no smoke is produced, and any unconsumed combustible matter in the products of incomplete combustion are consumed and the greatest possible heat efficiency of the fuel obtained.

My invention further consists of a novel method of regulating combustion wherein the draft for primary combustion is automatically controlled and wherein air heated to a desired temperature is introduced into the furnace above the fire, and simultaneously with the introduction of this heated air the elements of decomposed steam are injected into the furnace above the fire, and in proximity to the air entering at such a point, by which a new combination of elements will take place, producing a very high temperature.

The introduction of the superheated steam is automatically regulated by varying conditions of temperature and pressure within the furnace and the volume of superheated air and steam entering the furnace above the fire for secondary combustion, varies proportionately to the volume of air entering beneath the grates for primary combustion.

My invention further consists of a novel method of regulating combustion, whereby any desired constant of furnace conditions may be maintained at all times.

In order to illustrate one manner in which my method may be carried out in practice, I have shown in the accompanying drawings one type of a furnace wherein such method may be advantageously carried out, although it is to be understood that my method is not limited to use with the special type of furnace shown, but may be carried out in many other constructions or types of furnace and fuel consuming mechanism such as grates and stokers of various improved types.

Figure 2:
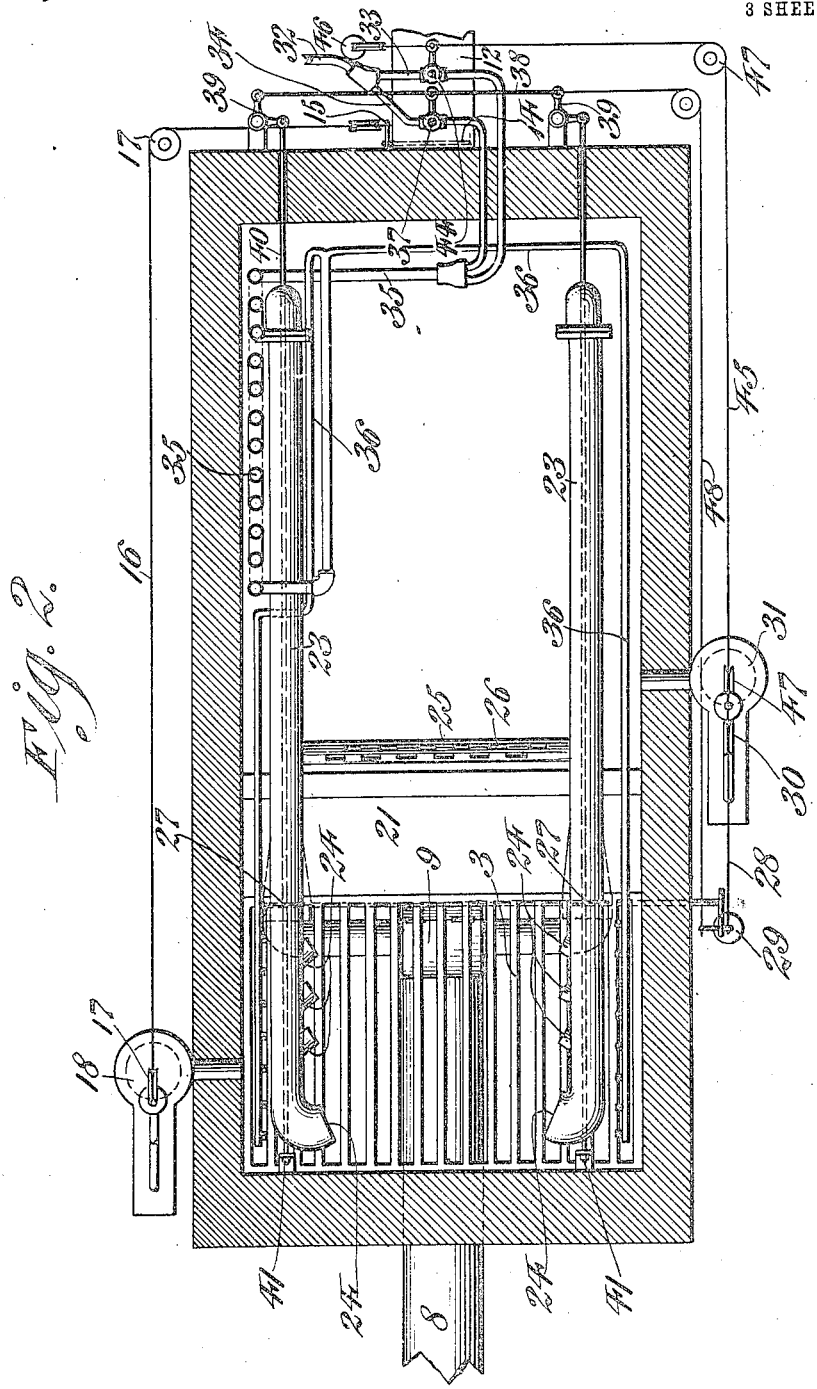

In the drawings, Figure 1 represents a sectional elevation of one type of construction in a furnace wherein my method may be carried out. Fig. 2 represents a sectional plan view of Fig. 1. Fig. 3 represents a sectional elevation of a furnace in conjunction with which my novel method may be very advantageously carried out. Fig. 4 represents a section on line x—x, Fig. 3.

Similar numerals of reference indicate corresponding parts in the figures.

1 designates a furnace provided with an ash pit 2, grates 3 and a combustion chamber 4.

5 designates a boiler which is connected by means of a conduit 6, with a fan or other draft producing mechanism 7, which latter is provided with a conduit 8, which connects with the ash pit 2 beneath the grates 3, said conduit being provided with a valve 9 which is operatively connected with a lever 10, whereby the same may be manually actuated when desired, it being understood that intermediate the steam connection 6 and the draft producing mechanism 7, I provide a regulating mechanism 11 of any approved or conventional type.

12 designates a furnace stack which has pivoted therein at 13 a damper 14.

15 designates an arm which is secured to the damper 14, said arm having connected therewith a suitable cable 16 which passes over pulleys 17 supported in proximity to the furnace and this cable is operatively connected with a regulating mechanism 18 of any desired type, the type shown in the drawings being a pressure regulator. The cable 16 is provided with a suitable counterbalance 19.

20 designates one or more air conduits which lead from the draft conduit 8 for primary combustion as most clearly seen in Fig. 2, said conduits passing through the bridge wall 21 to the rear of the furnace, at which point they are deflected upwardly as indicated at 22, and then deflected forwardly as indicated at 23, the same extending toward the front of the furnace and terminating above the grate 3, at which point they are provided with a series of discharge openings 24, whereby the heated air may be discharged into the fire above the grate.

25 designates a conduit connecting with the conduits 23 preferably beyond the bridge wall, said conduit 25 being provided with a series of apertures or slots 26 arranged therein in any suitable manner.

The ends of the conduits 20 which connect with the ash pit 2 have an enlarged diameter in which is pivoted a damper 27 to which is operatively connected a cable 28 provided with a counterbalance 29, said cable 28 passing over pulleys 30 and being connected with a pressure regulator 31 of any conventional or desired type.

32 designates a steam conduit leading from the boiler 5 and passing through suitable controlling valves and thence into the heat zone of the furnace, said conduit being provided with two branches 33 and 34 which enter the furnace and communicate with the conduit 3, the latter being arranged within the furnace in any desired manner in order that the steam passing through such conduit 35 will be highly heated, it being understood from Figs. 1 and 2 that this conduit is provided with branches 36 which discharge into the furnace above the bed of fuel.

37 designates a valve located in the conduit 34, said valve having operatively connected therewith the cable 38, which latter is secured to the bell crank levers 39 which are suitably fulcrumed on the furnace casing in any desired manner.

40 designates thermostats operatively connected with the bell crank levers 39, said thermostats extending into the furnace and preferably through the conduits 23, the ends of said thermostats being fixed as indicated at 41 in any suitable manner.

44 designates a valve located in the conduit 33, said valve being operatively connected with a cable 45 to which is secured a counter balance 46, said cable passing over suitable pulleys 47 and being operatively connected with a suitable pressure regulator such as the regulator 31.

48 designates a cable which passes over suitable pulleys 49, one end of said cable being operatively connected with the damper 27, the other end thereof being operatively connected with the valve 37, which is controlled by the thermostats 40. In the operation of the mechanism herein shown, the draft producing mechanism 7, which controls the passage of air through the conduit 8, for primary combustion, is automatically controlled by the steam pressure in the boiler 5, it being understood that when desired, the amount of air passing through the conduit 5 into the ash pit 2, may be regulated or entirely shut off by manually actuating the lever 10 which controls the damper.

In order to illustrate the manner in which the heated air and fluid delivered to the fire above the grates will be automatically controlled by varying conditions of pressure and temperature within the furnace, I have shown both a pressure regulator and a thermostat as being employed although one or the other may be dispensed with in the carrying out of my method.

If the fire doors are opened, thereby causing a change of pressure within the furnace, the pressure regulator 31 will instantly be operated and owing to the provision of the cable 45 operatively connected with the valve 44, said valve will be opened and steam may pass through the conduit 33 into the heat zone wherein it becomes superheated and is discharged into the furnace above the bed of fuel, preferably at a point near the discharge ports 24 for the heated air, and an increased volume of heated air will be drawn in through the conduits 23 and delivered into the furnace above the fire. This heated air and fluid is introduced at such a temperature that the component parts thereof are broken up so that as soon as the same enters the furnace and comes into contact with the unconsumed products of combustion therein, a recombining of the elements takes place so that a secondary and complete combustion is produced.

As the pressure within the furnace assumes its normal condition the pressure regulator will permit the valve 44 to gradually close. The thermostats which control the valve 37 will maintain a certain opening of such valve, due to the temperature of the air being delivered through the conduits 23 above the fire, so that while the thermostat is the main controlling element of the volume of air being delivered above the fire, the pressure regulator will control the volume of air delivered above the fire at such times as a greatly increased volume of heated air and fluid is required, such as is necessary when the fires are freshly charged.

50 designates a furnace provided with an ash pit 51, grates 52 and a combustion chamber 53, which latter is provided with the baffle plates 54 and 55 in order that the products of primary combustion will be suitably deflected, it being noted that the baffle plate 54 extends rearwardly from the front of the furnace while the baffle plate 55 extend forwardly from the top of the bridge wall 56.

57 designates a boiler which is connected by means of a suitable conduit with a draft producing mechanism 58 provided with a suitable regulating mechanism 59, said draft producing mechanism discharging between the grates 52, through the conduit 59, said discharge being manually controlled when desired by means of a suitable damper 60.

61 designates a pressure regulator which is operatively connected with a damper 62 in the stack 63.

64 designates an air conduit leading from the conduit 59 and passing through the bridge wall into the heat zone of the furnace, such conduit extending rearwardly toward the rear of the furnace and then being deflected forwardly and discharging through the bridge wall, as is indicated at 65.

66 designates the boiler tubes, it being noted that an upper baffle plate 67 and a lower baffle plate 68 is provided for suitably deflecting the passage of the products of combustion to the furnace stack 63.

69 designates a pressure regulator which is operatively connected with a damper 70 in the conduit 64, said pressure regulator being also operatively connected with a valve 71 in a by-pass 72 leading from a conduit 73, which latter communicates with the boiler 57.

74 designates a by-pass leading from the conduit 73 and provided with a suitable controlled valve 75 which latter is operatively connected by means of a suitable cable with the damper 70.

76 designates a thermostat which is located in the heat zone of the furnace and is operatively connected with the valve 75. The by-passes 72 and 74 discharge into a common conduit 77 which is arranged in any suitable manner within the heat zone of the furnace and passes through the bridge wall 56, discharging into the combustion chamber 53 in proximity to the discharge outlet of the conduit 64.

The operation of my novel method, in conjunction with this type of a furnace seen in Figs. 3 and 4, will be readily understood by reference to the operation already described with reference to Figs. 1 and 2, and I have therefore deemed it unnecessary to describe in detail the operation of this embodiment since it would be largely a repetition of the description of the operation of the construction seen in Figs. 1 and 2 to which I have hereinbefore referred.

In the present instance I have shown but two constructions wherein my novel method may be very advantageously carried out and excellent results obtained in practice, but it is of course evident that these simply show certain types of a mechanism to illustrate the manner in which my invention may be carried out in practice.

Having thus described my invention, what I claim as new and desire to secure by Letters Patent, is:—

1. The method of causing and controlling combustion of fuel, which consists in introducing into the furnace below and above the bed of fuel a volume of air automatically controlled, the air entering the furnace above the bed of fuel being heated to a desired temperature, and independently introducing fluid under pressure, automatically controlled, into the furnace above the bed of fuel.

2. The method of producing combustion of fuel which consists in introducing into the furnace, below and above the fire, a volume of air varying in relative proportion, the air entering the furnace above the fire being heated to a desired temperature, and introducing a volume of steam automatically controlled and heated to a desired temperature into the furnace above the fire.

3. The method of regulating combustion, which consists in automatically controlling the introduction of air delivered beneath the bed of fuel for primary combustion, simultaneously therewith automatically regulating the passing of a portion of such air into the furnace above the bed of fuel for secondary combustion, such portion of air being heated to a desired temperature during its transit, and automatically regulating the introduction of steam heated to a desired temperature into the furnace above the bed of fuel, the volume of said air and steam for secondary combustion varying relatively and simultaneously to the volume of air for primary combustion.

4. The method of regulating combustion, which consists in introducing air beneath the grates for primary combustion, automatically regulating such introduction, introducing, simultaneously and in relatively varying volume, air into the furnace above the grates and heating the same to a desired temperature during its transit, introducing steam heated to a desired temperature into the furnace above the fire for secondary combustion, and automatically regulating the introduction of the steam by varying conditions of pressure within the furnace.

5. The method of regulating combustion which consists in automatically regulating the introduction of air beneath the grates for primary combustion, and simultaneously automatically regulating the introduction of air above the grates for secondary combustion, the air above the grates being heated to a desired temperature and varying in volume proportionately to the air delivered beneath the grates for primary combustion, and the temperature of the heated air being automatically controlled by varying conditions of combustion.

6. The method of regulating combustion which consists in automatically varying the volume of air, for primary draft, to meet the changing rates of combustion within the furnace, and automatically diverting a desired portion of said primary draft, heating such portion to a desired temperature, and causing the same to enter the furnace above the bed of fuel, and automatically regulating the introduction of superheated steam above the bed of fuel.

7. The method of regulating combustion, which consists in automatically regulating the introduction of air from a common source simultaneously beneath and above the fire, so that the volume of air delivered, above the fire, varies proportionately to the volume of air delivered beneath the fire, the air delivered above the fire being heated to a desired temperature, within the heat zone of the furnace, and automatically regulating the introduction into the furnace above the fire simultaneously with the introduction of the heated air, superheated steam.

8. The method of controlling combustion which consists in automatically varying the supply of air for primary draft to meet the changing rates of combustion, and automatically diverting a desired portion of said primary draft, heating such portion to a desired degree and causing the same to enter the furnace above the bed of fuel, and automatically regulating the introduction above the bed of fuel of steam heated to a sufficient temperature to combine with the elements of the heated air and with any unconsumed combustible elements resulting from the primary combustion.

9. The method of regulating combustion, which consists in automatically regulating the introduction of air beneath the grates for primary combustion, and simultaneously automatically regulating the introduction of air above the grates for secondary combustion, the air above the grates being heated to a desired temperature and varying in volume proportionately to the air delivered beneath the grates for primary combustion, the temperature of the heated air being automatically controlled by varying conditions of combustion, and simultaneously and automatically controlling the exit from the furnace of the products of combustion.

10. The method of regulating combustion, which consists in automatically varying the volume of air for primary draft to meet the changing rates of combustion within the furnace, automatically diverting a desired portion of said primary draft, heating such portion to a desired temperature, and causing the same to enter the furnace above the bed of fuel, automatically regulating the introduction of superheated steam above the bed of fuel, and automatically controlling the exit from the furnace of the products of combustion.

11. The method of producing combustion which consists in establishing and maintaining a substantially uniform condition of pressure within the furnace above the grate, supplying air beneath the grate and varying the amount of air thus supplied according to the desired rate of combustion, and supplying a restricted quantity of air and an independent restricted quantity of steam above the grate, and varying the amount of air and steam thus supplied above the grate according to variations in the rate of combustion.

12. The method of causing and controlling combustion of fuel which consists in establishing and automatically maintaining a substantially uniform condition of pressure above the furnace fire and introducing below and above the bed of fuel a volume of air automatically controlled; and independently introducing into the furnace above the bed of fuel superheated steam, and automatically controlling the supply of said steam.

13. The method of regulating combustion, which consists in introducing below the bed of fuel a volume of air automatically controlled for primary combustion, introducing above the bed of fuel a volume of air automatically controlled, independently introducing into the furnace above the bed of fuel superheated steam, and automatically controlling the supply of said steam, the volume of air and steam introduced into the furnace above the bed of fuel automatically varying relatively to and simultaneously with the variation in the volume of air for primary combustion.

FRANCIS H. BROWN.

Witnesses:
HERBERT S. FAIRBANKS,
C. D. McVAY.